US010272450B2

(12) United States Patent
Nagata et al.

(10) Patent No.: US 10,272,450 B2
(45) Date of Patent: Apr. 30, 2019

(54) SPOUT APPARATUS

(71) Applicant: TOTO LTD., Kitakyushu-shi, Fukuoka (JP)

(72) Inventors: Katsuya Nagata, Kitakyushu (JP); Kiyotake Ukigai, Kitakyushu (JP)

(73) Assignee: TOTO LTD., Kitakyushu-Shi, Fukuoka (JP)

( * ) Notice: Subject to any disclaimer, the term of this patent is extended or adjusted under 35 U.S.C. 154(b) by 8 days.

(21) Appl. No.: 15/271,671

(22) Filed: Sep. 21, 2016

(65) Prior Publication Data
US 2017/0087567 A1 Mar. 30, 2017

(30) Foreign Application Priority Data
Sep. 30, 2015 (JP) ................. 2015-194250

(51) Int. Cl.
*B05B 1/08* (2006.01)
*B05B 1/20* (2006.01)
*B60S 1/52* (2006.01)

(52) U.S. Cl.
CPC ............. *B05B 1/202* (2013.01); *B05B 1/08* (2013.01); *B60S 1/52* (2013.01)

(58) Field of Classification Search
CPC .... B05B 1/08; B05B 1/10; B05B 1/18; B05B 1/185; B05B 1/202; B60S 1/52; F15C 1/22
USPC .............. 239/284.1, 566, 589.1, DIG. 3
See application file for complete search history.

(56) References Cited

U.S. PATENT DOCUMENTS

| 4,151,955 A * | 5/1979 | Stouffer | B05B 1/08 137/835 |
| 5,035,361 A * | 7/1991 | Stouffer | B05B 1/08 137/811 |
| 5,853,624 A * | 12/1998 | Raghu | B05B 1/08 239/589.1 |
| 2006/0065765 A1* | 3/2006 | Hester | B05B 1/08 239/589.1 |

(Continued)

FOREIGN PATENT DOCUMENTS

| JP | S58-49300 B2 | 11/1983 |
| JP | 2000-120141 A | 4/2000 |
| JP | 2004-275985 A | 10/2004 |

*Primary Examiner* — Viet Le
*Assistant Examiner* — Cody J Lieuwen
(74) *Attorney, Agent, or Firm* — Baker & Hostetler LLP (57) ABSTRACT

The present invention is a spout apparatus (1) for discharging water, including a spouting apparatus main body (2) and an oscillation inducing element (4) for discharging water with reciprocating motion; wherein the oscillation inducing element has: a water supply passageway (10*a*); a water colliding portion (14) for generating vortexes of mutually opposing circulations at the downstream side thereof by the collision of hot or cold water; a vortex street passageway (10*b*) having a tapered part, placed on the downstream side of the water supply passageway, which narrows in flow path cross section toward the downstream side; a separating portion (12) for suppressing the Coanda effect acting on the flow of water along the wall surface of a vortex street passageway; and a flow-aligning passageway (10*c*) having an essentially fixed flow path cross section which aligns the flow of hot or cold water which has passed through the separating portion.

9 Claims, 9 Drawing Sheets (56) References Cited

U.S. PATENT DOCUMENTS

2011/0233301 A1* 9/2011 Gopalan .................. B05B 1/08
    239/101

* cited by examiner

Prior Art

FIG.11

Prior Art

SPOUT APPARATUS

TECHNICAL FIELD

The present invention pertains to a spout apparatus, and more particularly to a spout apparatus for discharging hot or cold water from a spouting port while causing it to oscillate with a reciprocal motion.

BACKGROUND ART

Shower heads in which the direction of hot or cold water spouted from a spouting port changes in an oscillating manner are known. In spout apparatuses such as these shower heads, a nozzle is driven in an oscillating manner by the supply force of supplied water, causing the direction of hot or cold water spouted from a spouting port to change. In this type of spout apparatus, hot or cold water can be jetted from a single spouting port over a wide area, enabling the achievement in a compact constitution of a spout apparatus capable of spouting over a wide range.

Figure 10:
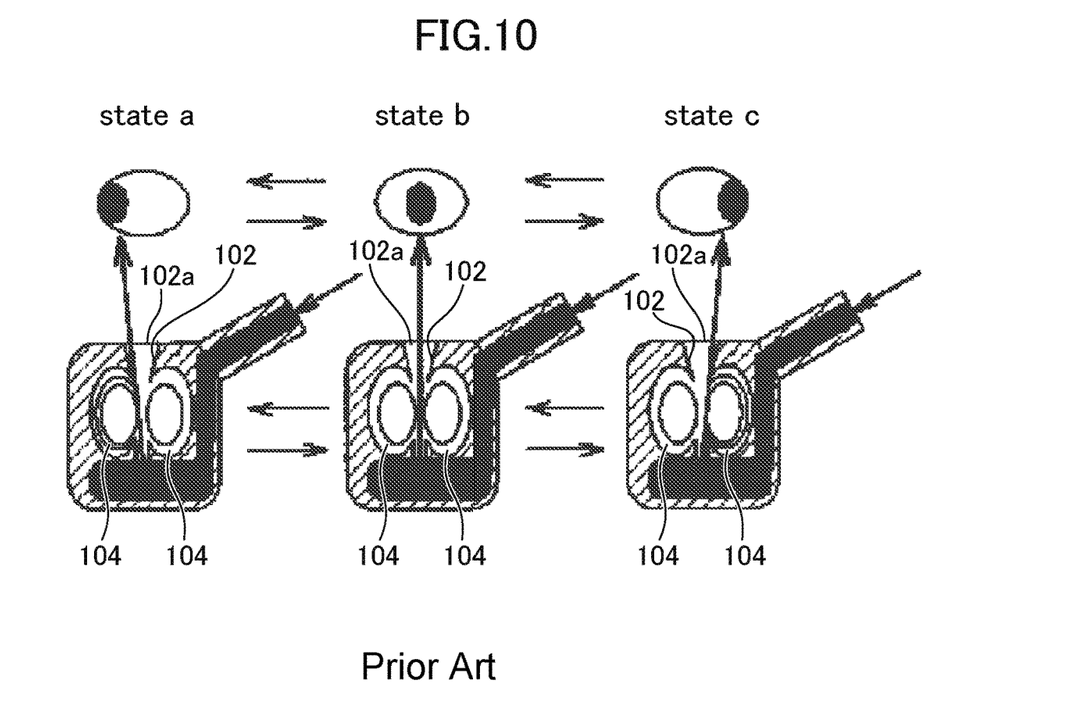
FIG. 10:
A diagram showing the operation of the fluidic element set forth in Patent Document 1.

At the same time, a warm water flush toilet seat apparatus is presented in Japanese Published Unexamined Patent Application 2000-120141 (Patent Document 1). In this warm water flush toilet seat apparatus, a self-oscillation is induced by a fluidic element nozzle, thus changing the direction in which flush water is jetted. Specifically, in this warm water flush toilet seat apparatus, as shown in FIG. 10, feedback flow paths 104 are provided on both sides of the spray nozzle 102. Each of the feedback flow paths 104 is a loop-shaped flow path communicating with the spray nozzle 102, and a portion of the flush water flowing through the spray nozzle 102 flows in and circulates therein. The spray nozzle 102 is shaped to widen in a tapered form toward a spray port 102a having an elliptical cross section.

When flush water is supplied, the flush water sprayed from spray nozzle 102 is drawn by the Coanda effect to the wall surface on one side or the other of the elliptical cross section spray port 102a and sprayed so as to follow this wall (state "a" in FIG. 10). When flush water is sprayed along one of the wall surfaces, the flush water also flows into the feedback flowpath 104 on the side on which the flush water is being sprayed, and pressure inside the feedback flowpath 104 rises. Due to the rise in pressure, sprayed flush water is pushed, flush water is drawn to the wall surface on the opposite side and sprayed along the wall surface on the opposite side (FIG. 10, state "a"→"b"→"c"). In addition, when flush water is sprayed along the opposite side wall surface, the pressure now rises in the feedback flowpath 104 on the opposite side, and sprayed flush water is pushed back (FIG. 10, state "c"→"b"→"a"). By repetition of this action, sprayed flush water changes direction in an oscillating manner between states "a" and "c" in FIG. 10.

A pure fluidic element is set forth in Japanese Published Unexamined Patent Application 2004-275985 (Patent Document 2). In this pure fluidic element, a linking duct which traverses the fluid jet nozzle is provided; the operation of this linking duct causes an alternating rise in pressure on the upper and lower sides of the fluid jet nozzle. Due to the Coanda effect, the jet current pushed by this pressure rise becomes a jet current along the top plate of the spray jet nozzle, or along the bottom plate thereof; these states are repeated at a certain cycle, becoming a flow in which the spray direction changes in an oscillating manner.

In addition, an oscillating spray apparatus is set forth in Japanese Published Examined Patent Application S.58-49300 (Patent Document 3). This oscillating spray apparatus has the constitution shown in FIG. 11; by using the Karman vortex produced inside an anterior chamber 110, the direction of the jet flow sprayed from an outlet 112 is changed in an oscillating manner. First, a fluid which has flowed into the anterior chamber 110 from an intake port 114 collides with a triangular cross section obstacle 116 placed in an island formation inside the anterior chamber 110. Upon fluid collision, a Karman vortex is alternately produced downstream of the obstacle 116 on the upper and lower sides of the obstacle 116, forming a vortex street.

This Karman vortex street reaches outlet 112 as it grows. Close to the outlet 112, the flow velocity on the side where the vortex street vortex is present speeds up, whereas the flow velocity on the opposite side slows. In the example shown in FIG. 11, Karman vortexes are alternately created on the upper and lower sides of the obstacle 116, and this vortex street sequentially reaches up to the outlet 112, therefore a high flow velocity state is alternately produced on the upper and lower sides in the vicinity of the outlet 112. In the state of high velocity flow on the upper side, the fluid in a high flow velocity state collides with a wall surface 110a on the upper side of the outlet 112 and its direction is changed, whereas the fluid sprayed from the outlet 112 becomes a jet flow which in total is directed diagonally downward. On the other hand in the state of high velocity flow on the lower side, the fluid in a high flow velocity state collides with a wall surface 110b on the lower side of the outlet 112, and a jet flow is sprayed from the outlet 112 in a diagonally upward direction. The alternating repetition of these states results in a reciprocating oscillation during spraying from the outlet 112.

As described above, a system can be conceived in which the fluidic element set forth in Patent Documents 1 through 3 is applied to a spout apparatus such as a shower head, and hot or cold water is discharged as it is oscillates in a reciprocating motion.

PRIOR ART REFERENCES

Patent Documents

Patent Document 1
  JP 2000-120141 A
Patent Document 2
  JP 2004-275985 A
Patent Document 3
  JP S58-49300 B

SUMMARY OF THE INVENTION

Problems the Invention Seeks to Resolve

First, in a spout apparatus for changing the direction of hot or cold water spouted by driving a spray nozzle in an oscillating manner, the nozzle must be driven, leading to the problem of complex structure around the nozzle, making it difficult to house multiple nozzles compactly in a spout apparatus. Also, in this type of spout apparatus the nozzle physically moves, therefore wear can easily occur in moving parts, leading to the problem that to avoid wear, the selection of materials for members comprising the movable portion is limited. An additional problem is the increase in cost due to the need to form movable parts with a complex structure out of a wear-resistant material.

The type of spray apparatus set forth in Patent Documents 1 through 3, on the other hand, utilizes an oscillation phenomenon caused by a fluidic element; the spraying direction of a fluid can be changed without providing a movable member, thus yielding the advantage that the nozzle part can be compactly constituted by a simple structure.

However the inventors have discovered the problem that when the fluidic element set forth in Patent Documents 1 and 2 is applied to a spout apparatus such as a shower head, the feeling of being under the sprayed hot or cold water is not comfortable. Here, the "good shower comfort" targeted by the inventors refers to a state whereby large droplets of hot or cold water are evenly spouted over a wide area. I.e., when droplets of hot or cold water spouted from a shower head are excessively small, the hot or cold water becomes a mist, so that even if the amount of water is the same, the true sensation of showering cannot be attained. When discharged hot or cold water becomes non-uniform within the spout area, the user cannot wash off intended areas uniformly, and receives a poor impression.

The fluidic element in Patent Documents 1 and 2 takes advantage of the Coanda effect, whereby a jetted fluid flows along a wall surface, producing an unevenness in fluid sprayed within the discharge area. I.e., in the warm water flush toilet seat apparatus shown in FIG. 10, sprayed flush water transitions between states a, b, and c, but in actuality the length of the a and c states, when the jet flow is drawn to the wall surface for a long period, is long; whereas the intervening periods (close to state b) are extremely short. Thus when the fluidic element set forth in Patent Documents 1 and 2 is applied to a spout apparatus such as shower head, a "hollow" state is produced, in which spouted water is concentrated in the peripheral part of the spout area, with only a small amount of spouted water in the center area, resulting in a poor shower sensation.

Figure 11:
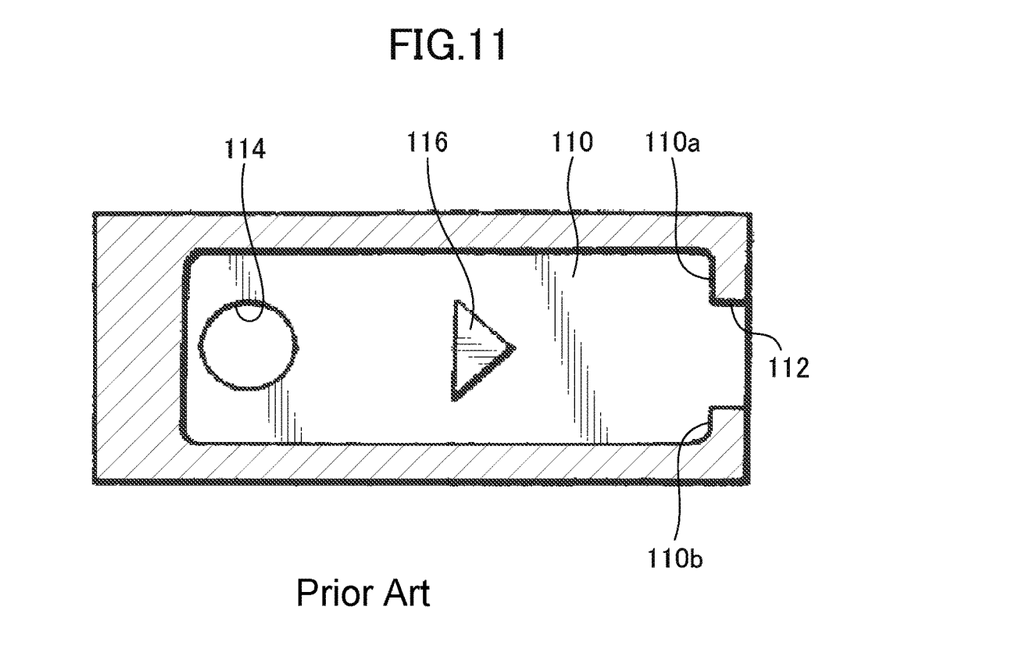
FIG. 11:
A diagram showing the constitution of the fluidic element set forth in Patent Document 3.

In contrast, the fluidic element set forth in Patent Document 3 applies a Karman vortex, so there is virtually no drawing of the jet flow is drawn to the wall surface as it flows. Hence a substantially uniform spout water amount can be obtained in the spout area formed by changing the spouting direction in an oscillating manner. However the present inventors discovered the problem that when a fluidic element, shown in FIG. 11, is applied to a spout apparatus such as a shower head, the area over which the sprayed water oscillates with reciprocal motion changes with strong dependency on the flow volume of jetted hot or cold water. I.e., in the fluidic element shown in FIG. 11, increasing the flow volume and raising the flow velocity of hot or cold water sprayed from the outlet 112 results in the hot or cold water colliding with the wall surface 110a (or 110b) at a high velocity, greatly altering its direction. Hence when flow volume is high, water sprayed from the outlet 112 spreads out over a wide area, whereas when flow volume decreases, the spout area is narrowed. The spout area thus varies greatly as flow volume changes, making this a hard-to-use spout apparatus.

The present invention therefore has the object of providing a spout apparatus with a simple and compact structure, capable of supplying an easy-to-use water spouting.

Means for Resolving Problems

To solve these problems, the present invention is a spout apparatus for discharging hot or cold water with reciprocal motion from a spouting port, comprising: a spout apparatus main body; and an oscillation inducing element disposed on the spout apparatus main body, for discharging supplied hot or cold water with reciprocal motion; wherein the oscillation inducing element comprises: a water supply passageway into which hot or cold water supplied from the spout apparatus main body flows; a water collision portion disposed on a downstream end portion of the water supply passageway so as to block a portion of a cross section of the water supply passageway, the water collision portion alternately produces oppositely circulating vortexes on the downstream side of the water collision portion by colliding with hot or cold water guided by the water supply passageway, a vortex street passageway, comprising a tapered part, disposed on the downstream side of the water supply passageway so as to guide the vortex formed by the water collision portion while causing it to grow, and the tapered part being tapered so that a cross section of flow path narrows toward the downstream side; a separating portion, placed at the downstream end of the vortex street passageway, for suppressing the Coanda effect acting on the flow of hot or cold water along a wall surface of the vortex street passageway; and a flow-aligning passageway, placed on the downstream side of the separating portion, for aligning the flow of hot or cold water passing through the separating portion.

In the present invention thus constituted, water spouted from a spout apparatus can be made to oscillate with a reciprocal motion by an oscillation inducing element, enabling hot or cold water to be discharged over a wide area from a single spouting port, using a compact and simple structure. Also, the spout water direction can be changed without moving the discharging nozzle, allowing the spout apparatus to be constituted without wear or similar problems in the moving portions, at a low cost and high durability. Also, because a tapered portion with a narrowing flow path cross section is provided in the vortex street passageway in the oscillation inducing element, an easily usable spout apparatus can be constituted without a high dependency on the amount of hot or cold water spouted. I.e., hot or cold water flowing inside the vortex street passageway flows along this tapered wall surface, and the direction of hot or cold water flow is regulated to a direction generally along the tapered wall surface, whereby changes in spout water area caused by flow volume changes are suppressed, and the spout area can be made substantially constant.

However, while it did become possible to improve the dependence of the spout area on spout water flow volume by conforming the flow of hot or cold water to the tapered wall surface, this arrangement also produced new technical problems. I.e., the spouting obtained in this way was a "hollow" one in which the water volume in the peripheral part of the spout area was high and the water volume close to the center was low, resulting in a poor showering sensation. This is believed to occur because the Coanda effect is produced by hot or cold water flowing along a tapered wall surface, so that spout water concentrates in the periphery of the spout area. To solve this new technical problem, the present inventors therefore provided a separating portion at the downstream end of the vortex street flow path so as to cause the flow of hot or cold water along the vortex street wall surface to separate from same. The present inventors thus succeeded in suppressing changes in spout water area caused by changes in flow volume, while suppressing the Coanda effect occurring during outflows from the flow-aligning passageway by provision of a separating portion, and evenly distributing liquid droplets over the spout area.

In the present invention, preferably, the separating portion is formed by a separating portion wall surface disposed to slope relative to a center axis line of the vortex street passageway, and a slope angle of the separating portion wall surface is formed to be greater than the slope angle of a tapered part wall surface forming the tapered part.

In the invention thus constituted, the slope angle of the separating portion wall surface is formed to be greater than the slope angle of the tapered part wall surface, therefore the flow inside the vortex street passageway along the tapered part wall surface can be effectively separated from the wall surface, and the Coanda effect can be reliably suppressed.

In the present invention, preferably, an angle formed by the tapered part wall surface and the separating portion wall surface is greater than 90°.

In the invention thus constituted, the angle formed by the tapered part wall surface and the separating portion wall surface is greater than 90°, therefore changes in the hot or cold water oscillation amplitude caused by changes in spout water flow volume can be effectively suppressed.

In the present invention, preferably, the separating portion wall surface is placed substantially perpendicular to the center axis line of the vortex street passageway.

In the invention thus constituted, the separating portion wall surface is placed essentially perpendicular to the center axial line of the vortex street passageway, therefore the Coanda effect occurring when hot or cold water is discharged from the discharge port can be effectively suppressed.

In the present invention, preferably, a length of the separating portion wall surface is shorter than a length of the tapered part wall surface.

In the invention thus constituted, the length of the separating portion wall surface is shorter than the length of the tapered part wall surface, therefore occurrences of the Coanda effect caused by the flow of hot or cold water along the separating portion wall surface over a long distance can be prevented.

In the present invention, preferably, the tapered part wall surface is sloped from 3° to 25° relative to the center axis line of the vortex street passageway.

In the invention thus constituted, changes in the spout area due to spout flow volume and the occurrence of the Coanda effect during discharge can be suppressed in a balanced manner.

Effect of the Invention

Using the present invention, a spout apparatus with good usability can be compactly constituted using a simple structure.

EMBODIMENTS

Next, referring to attached figures, we explain a shower head serving as a spout apparatus in a preferred embodiment of the invention.

Figure 1:
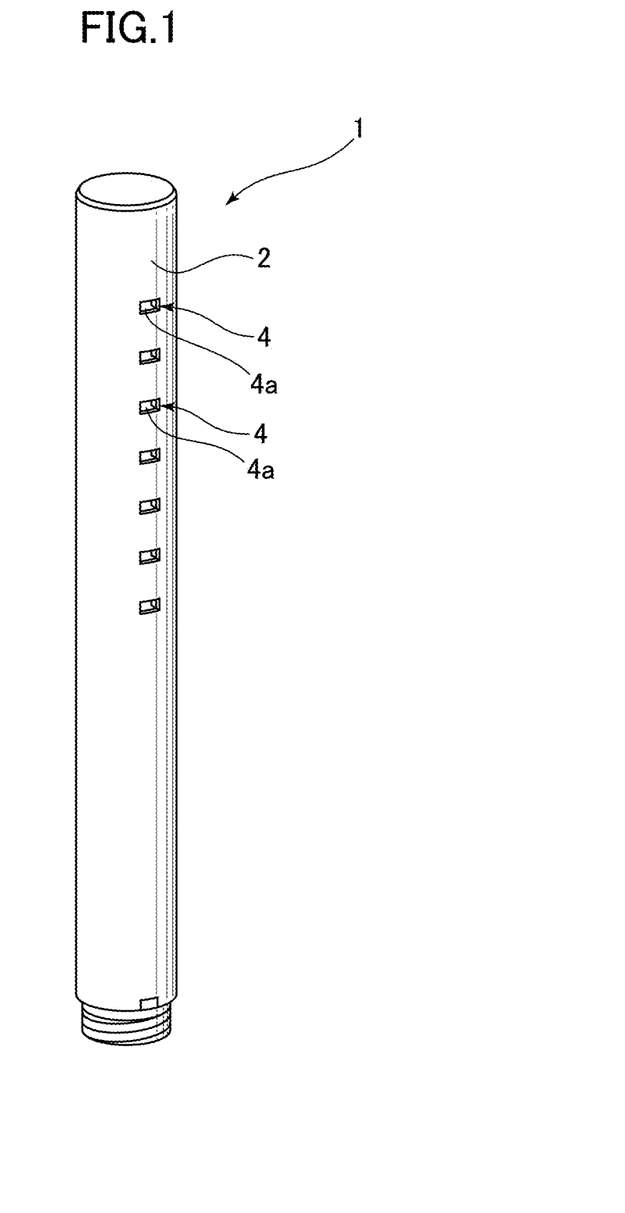
FIG. 1:
A perspective view showing the exterior appearance of a shower head according to a first embodiment of the invention.
Figure 2:
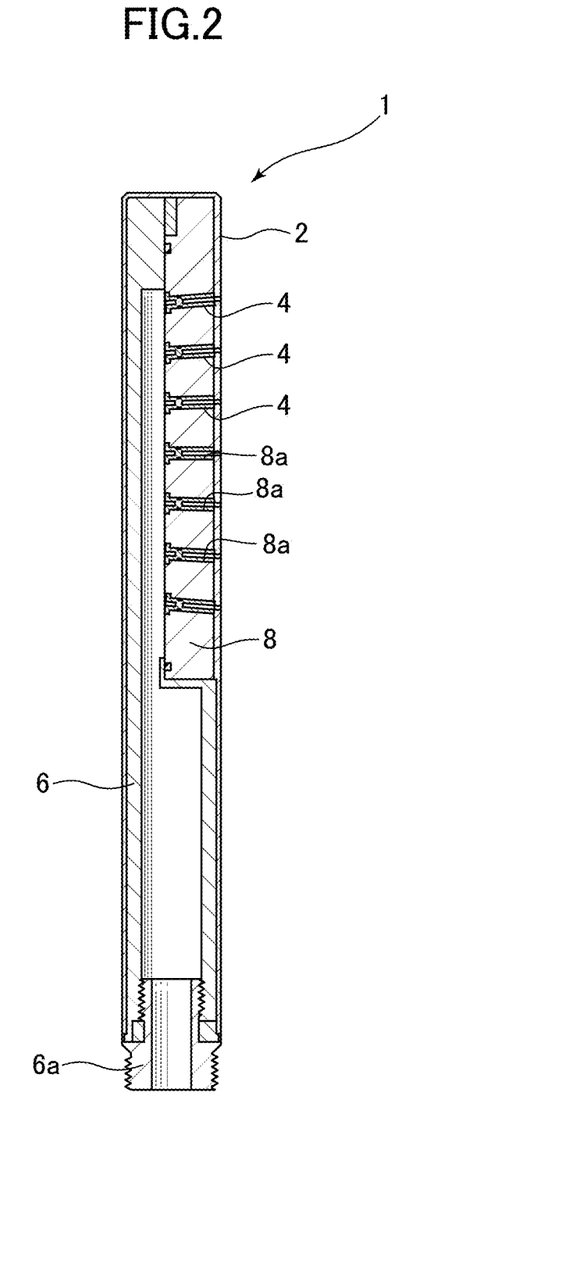
FIG. 2:
A full cross sectional view of a shower head according to a first embodiment of the invention.
Figure 3:
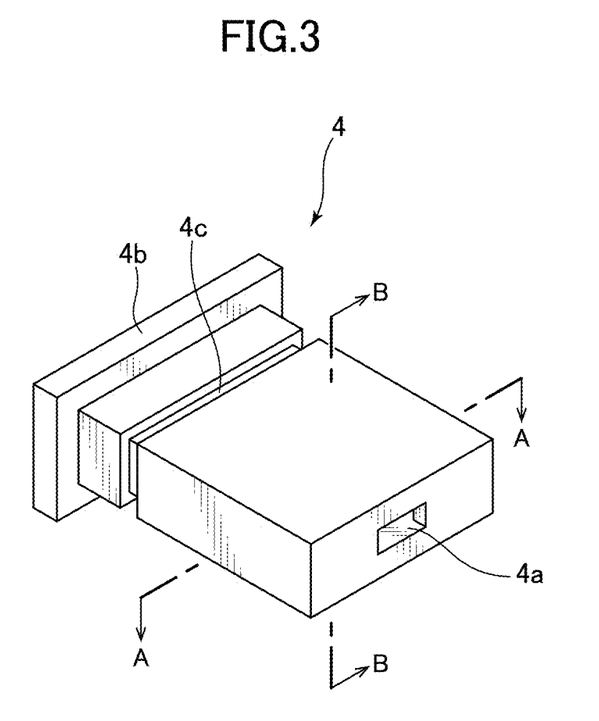
FIG. 3:
A perspective view showing the exterior appearance of an oscillation inducing element provided in a shower head according to a first embodiment of the invention.

First, referring to FIGS. 1 through 7A-7B, we explain a shower head according to a first embodiment of the invention. FIG. 1 is a perspective view showing the exterior appearance of a shower head according to a first embodiment of the invention. FIG. 2 is a perspective view showing a full cross section of a shower head according to a first embodiment of the invention. FIG. 3 is a perspective view showing the exterior appearance of a fluidic element provided in a shower head according to a first embodiment of the invention. FIG. 4A is a plan view cross section of an oscillation inducing element in a first embodiment of the invention; FIG. 4B is a vertical cross section of an oscillation inducing element.

As shown in FIG. 1, the shower head 1 of the present embodiment has a shower head main body 2, being an approximately cylindrical spout apparatus, and seven oscillation inducing elements 4, arrayed and embedded in a straight line in the axial direction inside the shower head main body 2.

When hot or cold water is supplied from a shower hose (not shown) connected to the shower head main body 2 base end portion 2a, the shower head 1 of the present embodiment discharges hot or cold water from the spout water ports 4a on each oscillation inducing element 4. Note that in the present embodiment hot or cold water is discharged from each spouting port 4a so as to form a fan shape having a predetermined center angle within a plane approximately perpendicular to the center axis line of the shower head main body 2.

Next, referring to FIG. 2, we explain the internal structure of the shower head 1.

As shown in FIG. 2, a water conduit-forming member 6 forming a water conduit, and an oscillation inducing element holding member 8 for holding each oscillation inducing element 4, are built into the shower head main body 2.

The water conduit-forming member 6 is an approximately cylindrical member, and is constituted to form a flow path for hot or cold water supplied into the shower head main body 2. A shower hose connecting member 6a is watertightly sealed to the base end portion of the water conduit-forming member 6. The end portion of the water conduit-forming member 6 is notched into a semi-circular cross sectional shape, and the oscillation inducing element holding member 8 is disposed in this notched part.

The oscillation inducing element holding member 8 is approximately a semi-cylindrical member; a round cylinder is formed by the placement in the notched portion of the water conduit-forming member 6. A packing 6b is disposed between the water conduit-forming member 6 and the oscillation inducing element holding member 8, and watertightness is secured between these two. In addition, seven element insertion holes 8a for holding each oscillation inducing element 4 are formed in a straight line in the axial direction at substantially equal spacing on the oscillation inducing element holding member 8. Hot or cold water flowing into the water conduit-forming member 6 by this means flows in at the rear side of each oscillation inducing element 4 held to the oscillation inducing element holding member 8, and is discharged from the spouting port 4a disposed on the front. Each element insertion hole 8a is placed so as to tilt slightly relative to a plane perpendicular to the center axis line of the shower head main body 2, and hot or cold water sprayed from each oscillation inducing element 4 is discharged so as to as a whole spread out slightly in the axial direction of the shower head main body 2.

Figure 4A:
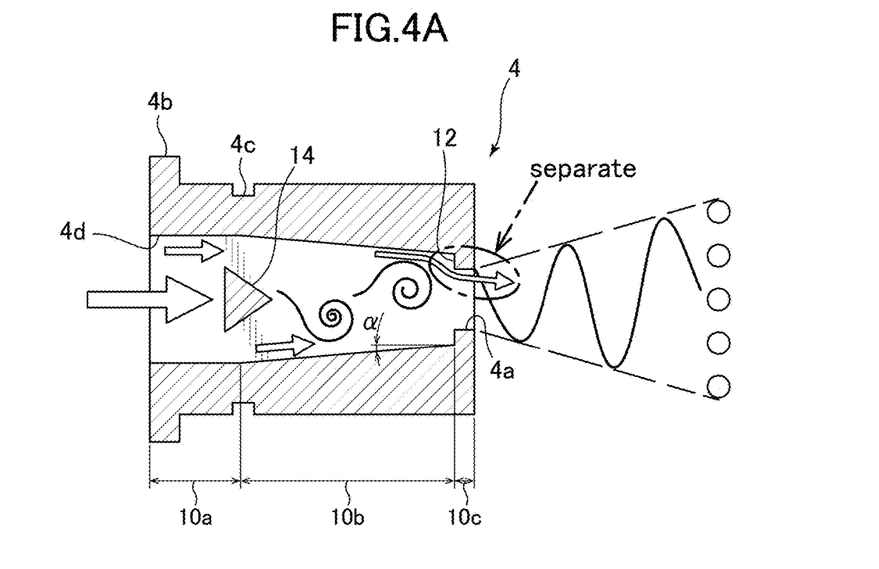
FIG. 4A:
A plan view cross section of an oscillation inducing element in a first embodiment of the invention.
Figure 4B:
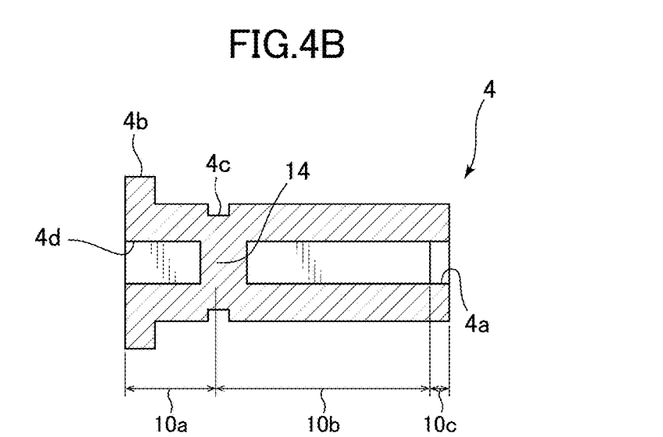
FIG. 4B:
A vertical cross section of an oscillation inducing element.

Next, referring to FIGS. 3 and 4A-4B, we explain the constitution of an oscillation inducing element 4 built into the shower head of the present embodiment.

As shown in FIG. 3, the oscillation inducing element 4 is generally a thin, rectangular parallelepiped member; an elongated spouting port 4a is disposed at the end surface on the front side thereof, and a flange portion 4b is formed at the end portion on the rear surface side thereof. In addition, the flange portion 4b and channel 4c are disposed to encircle the perimeter of the oscillation inducing element 4. An O-ring (not shown) is inserted into this channel 4c, securing watertightness relative to the element insertion holes 8a on the oscillation inducing element holding member 8. The oscillation inducing element 4 is positioned relative to the oscillation inducing element holding member 8, and is prevented by the flange portion 4b from falling off the oscillation inducing element holding member 8 due to water pressure.

FIG. 4A is a cross section seen along line A-A in FIG. 3; FIG. 4B is a cross sectional diagram along line B-B in FIG. 3.

As shown in FIG. 4A, a passageway with a rectangular cross section is formed on the inside of the oscillation inducing element 4 so as to penetrate in the longitudinal direction. This passageway is formed, in order from the upstream side, by the inlet portion water supply passageway 10a, the vortex street passageway 10b, and the flow-aligning passageway 10c.

The water supply passageway 10a is a straight line passageway with a substantially constant rectangular cross section, extending from the inflow port 4d on the rear surface side of the oscillation inducing element 4.

The vortex street passageway 10b is a rectangular cross section passageway disposed to connect (steplessly) to the water supply passageway 10a on the downstream side of the water supply passageway 10a. I.e, the device end of the water supply passageway 10a and the upstream end of the vortex street passageway 10b have the same dimensions and shapes. The pair of opposing wall surfaces (wall surfaces on both sides) of vortex street passageway 10b are tapered so that toward the downstream side, the flow path cross section narrows over the entire vortex street passageway 10b. I.e., the vortex street passageway 10b is constituted to narrow toward the downstream side, gradually narrowing in width.

The flow-aligning passageway 10c is a rectangular cross section passageway disposed on the downstream side to communicate with the vortex street passageway 10b; it is formed in a straight line, with a fixed cross section. Hot or cold water including vortex streets guided by the vortex street passageway 10b is aligned by this flow-aligning passageway 10c and discharged from the spouting port 4a. The flow path cross section of this flow-aligning passageway 10c is constituted to be smaller than the flow path cross section of the downstream end portion of the vortex street passageway 10b, and a step portion 12 is formed between the vortex street passageway 10b and the flow-aligning passageway 10c. The stepped portion wall surface, which is the surface of this stepped portion 12, is oriented in a direction perpendicular to the center axis line of the vortex street passageway 10b. The angle formed by the vortex street passageway 10b tapered wall surface (the tapered part wall surface) and the stepped portion wall surface is therefore greater than 90° (90°+α°).

Meanwhile, as shown in FIG. 4B, the wall surfaces (ceiling surface and floor surface), opposing one another in the height direction of the water supply passageway 10a, the vortex street passageway 10b, and the flow-aligning passageway 10c are all disposed on the same plane. I.e., the heights of the water supply passageway 10a, vortex street passageway 10b, and flow-aligning passageway 10c are all the same, and are fixed.

Next, a water collision portion 14 is formed on the downstream end portion of the water supply passageway 10a (close to the connecting portion of the water supply passageway 10a and the vortex street passageway 10b); this water collision portion 14 is disposed to block a portion of the flow path cross section of the water supply passageway 10a. This water collision portion 14 is a triangular columnar part extending so as to link to opposing wall surfaces (ceiling surface and floor surface) in the height direction of the water supply passageway 10a, and is disposed in an island shape at the center in the width direction of the water supply passageway 10a. The cross section of the water collision portion 14 is formed in an isosceles right triangle shape; the hypotenuse thereof is disposed to be perpendicular to the center axis line of the water supply passageway 10a, and the right angle part of the isosceles right triangle is disposed to face downstream. Placement of this water collision portion 14 produces a Karman vortex on the downstream side thereof, causing hot or cold water discharged from the spouting port 4a to oscillate with a reciprocal motion. Also, in the present embodiment the right isosceles triangle hypotenuse part of the water collision portion 14 (the upstream end of the water collision portion 14) is positioned further upstream than the upstream end of the vortex street passageway 10b, and the right angle part of the right isosceles triangle (the downstream end of the water collision portion 14) is disposed to be further downstream than the upstream end of the vortex street passageway 10b.

Note that in the present embodiment the angle formed between the vortex street passageway 10b side wall surface and the center axis line (angle α in FIG. 4A) is approximately 7°. The angle formed by the side wall surface and the center axis line is preferably between approximately 3° and 25°. By setting the angle this way, Coanda effect occurrences can be suppressed, while changes in spout area associated with changes in discharge flow volume are also suppressed. In addition, the flow path cross section of the part in which a portion is blocked by the water collision portion 14 at the downstream end of the water supply passageway 10a is constituted to be larger than the flow path cross section of the flow-aligning passageway 10c.

Next, referring to FIGS. 5A-5C through 7A-7B, we explain the operation of a shower head 1 according to a first embodiment of the invention.

Figure 5A:
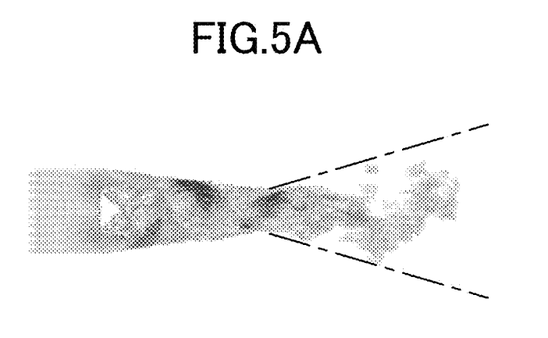
FIGS. 5A-5C:
A diagram showing a fluid simulation result analyzing the flow of hot or cold water in an oscillation inducing element provided in a shower head according to an embodiment of the invention.
Figure 5B:
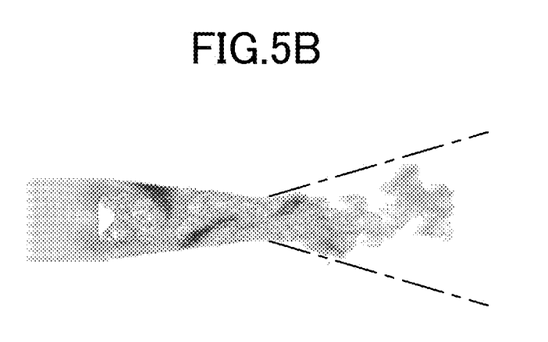
Figure 5C:
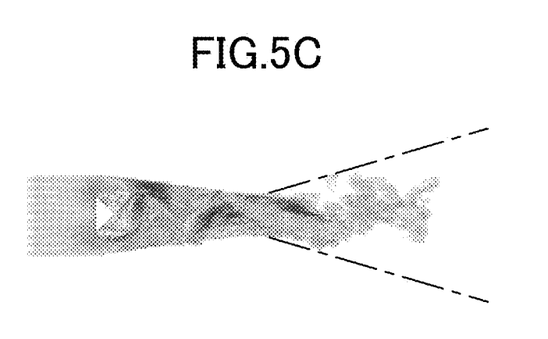
Figure 6A:
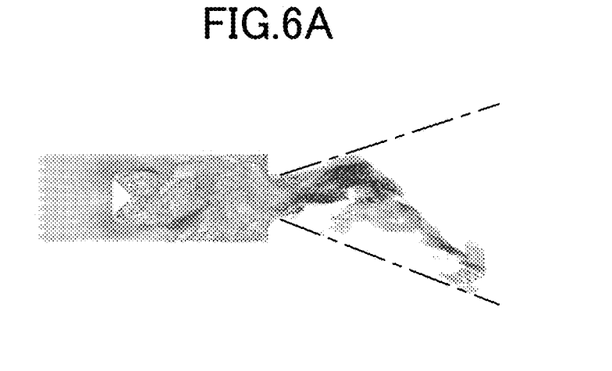
FIGS. 6A-6C:
A diagram showing a fluid simulation result analyzing the flow of hot or cold water in an oscillation inducing element having the structure shown in FIG. 11.
Figure 6B:
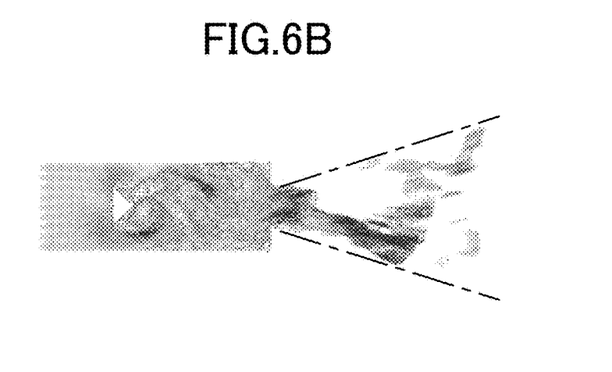
Figure 6C:
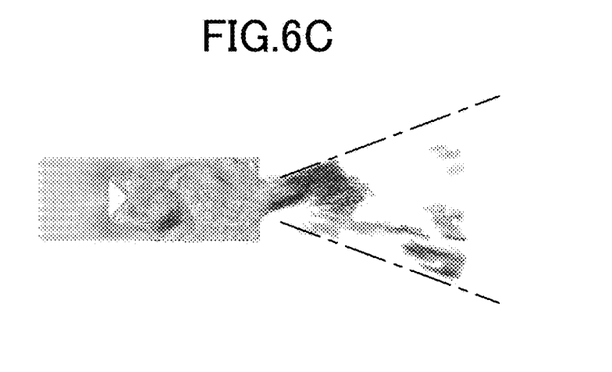
Figure 7A:
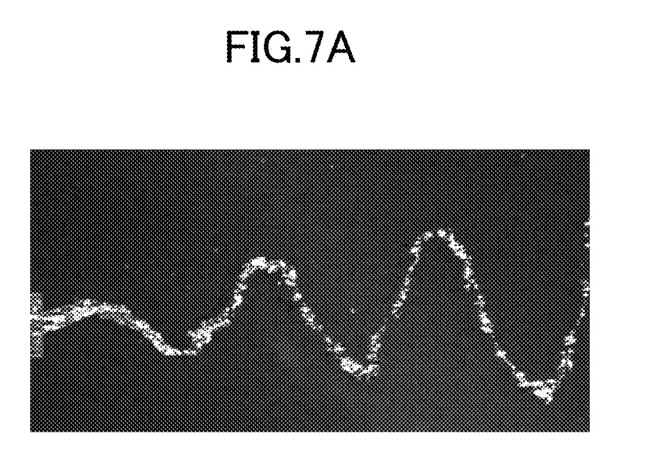
FIG. 7A:
An example of a stroboscopic photograph showing the flow of hot or cold water discharged from a single oscillation inducing element provided in a shower head according to a first embodiment of the invention.
Figure 7B:
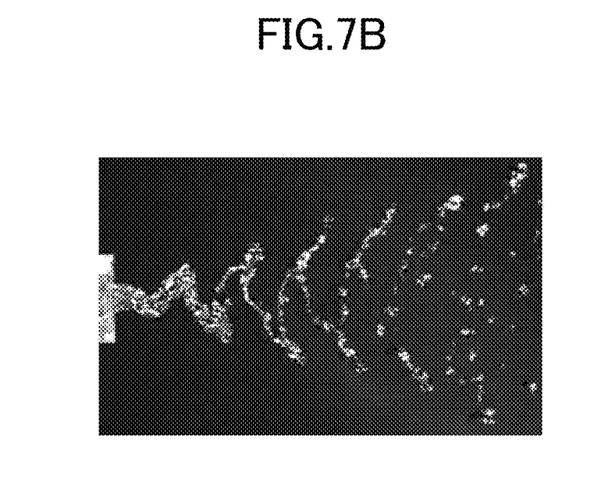
FIG. 7B:
A comparative example of a stroboscopic photograph showing the flow of hot or cold water discharged from an oscillation inducing element having the structure shown in FIG. 11.

FIG. 5A-5C is a diagram showing a fluid simulation result analyzing the flow of hot or cold water in an oscillation inducing element 4 provided in a shower head 1 according to an embodiment of the invention. FIG. 6A-6C is a diagram showing a fluid simulation result analyzing the flow of hot or cold water in an oscillation inducing element having the structure shown in FIG. 11. FIG. 7A is an example of a stroboscopic photograph showing the flow of hot or cold water discharged from a single oscillation inducing element 4 provided on the shower head 1 in an embodiment of the invention. FIG. 7B is a comparative example of a stroboscopic photograph showing the flow of hot or cold water discharged from an oscillation inducing element having the structure shown in FIG. 11.

First, hot or cold water supplied from a shower hose (not shown) flows into the water conduit-forming member 6 inside the shower head main body 2 (FIG. 2), then further flows into the inflow port 4d of each oscillation inducing element 4 held by the oscillation inducing element holding member 8. Hot or cold water which has flowed into the water supply passageway 10a from the oscillation inducing element 4 inflow port 4d collides with the water collision portion 14, which is disposed to block a portion of that flow path. Thus Karman vortex streets of mutually opposing circulations are formed at the downstream side of the water collision portion 14. The Karman vortex formed by this water collision portion 14 grows as it is guided by the vortex street passageway 10b, which narrows in a tapered shape, and reaches the flow-aligning passageway 10c.

The results of analysis by fluid simulation of the flow of hot or cold water in the vortex street passageway 10b are shown in FIG. 5A through 5C. As shown in this fluid simulation, a vortex is produced on the downstream sides of the water collision portion 14, and the flow velocity is faster in that part. These high flow velocity parts (the dense colored part in FIG. 5A-5C) alternately appear on both side of the water collision portion 14 and advance along the wall surface of the vortex street passageway 10b toward the spouting port 4a. The flow of hot or cold water which has flowed into the flow-aligning passageway 10c on the downstream side of the vortex street passageway 10b is aligned here. Hot or cold water discharged from the spouting port 4a through the flow-aligning passageway 10c is directed to turn based on the flow velocity distribution in the spouting port 4a, and the discharge direction of the high flow velocity part thereof changes depending on the up and down movement shown in FIG. 5A-5C. I.e., when the high flow velocity part of the hot or cold water is located at the top end of the spouting port 4a in FIG. 5A-5C, the hot or cold water is sprayed downward; when the high flow velocity part thereof is positioned at the bottom end of the spouting port 4a, hot or cold water is sprayed upward. Thus by alternately generating reverse circulating Karman vortexes on the downstream side of the water collision portion 14, a flow velocity distribution occurs in the spouting port 4a, and the jet flow is deflected. Because the position of the high flow velocity part moves reciprocally with the advance of the vortex street, sprayed hot or cold water also oscillates with a reciprocal motion.

Since a step portion 12 is placed between the vortex street passageway 10b and the flow-aligning passageway 10c, the flow along the tapered wall surface (tapered part wall surface) of the vortex street passageway 10b is here separated and flows into the flow-aligning passageway 10c. The separation of the flow from the wall surface by this step portion 12 results in suppression of the Coanda effect occurring at the wall surface of the flow-aligning passageway 10c, so that hot or cold water discharged from the spouting port 4a is moved smoothly back and forth. Hence the stepped portion 12 acts as a separating portion, separating the flow along the wall surface of the vortex street passageway 10b, and suppressing the Coanda effect. Therefore the stepped portion wall surface, which is the surface of the stepped portion 12, functions as a separating portion wall surface.

As shown in FIG. 6A-6C, on the other hand, in an oscillation inducing element with the structure shown in FIG. 11, while it is true that a Karman vortex street is created on the downstream side of the collision portion, the hot or cold water sprayed in the spouting port part is greatly deflected, and the spout area of the sprayed hot or cold water is over-wide. In a simulation in which the flow volume of discharged hot or cold water is reduced, it was confirmed that under these circumstances the sprayed hot or cold water is not deflected very much, and the spout area is narrowed. In the oscillation inducing element 4 of the present embodiment, on the other hand, it was confirmed that an appropriately large spout area can be obtained with a relatively broad range of flow volumes.

Next, as shown in FIG. 7A, in a stroboscopic photograph showing the flow of hot or cold water discharged from an oscillation inducing element 4 in the present embodiment, a clean sinusoidal flow is obtained because the spout direction moves smoothly back and forth. By comparison, hot or cold water discharged from an oscillation inducing element having the structure shown in FIG. 11, shown as a comparative example in FIG. 7B, although it does oscillate with a reciprocal motion, is curved in an arc shape. This is because the change in hot or cold water discharge direction is not smooth; the duration of time with the deflection angle at maximum is long, and the duration of the jet flow moving time in the period of the maximum deflection angle is short. Thus by using the oscillation inducing element 4 in the present embodiment, a shower spouting can be obtained providing a good shower sensation can be obtained, with which large liquid droplets are discharged uniformly over a wide area.

Figure 8:
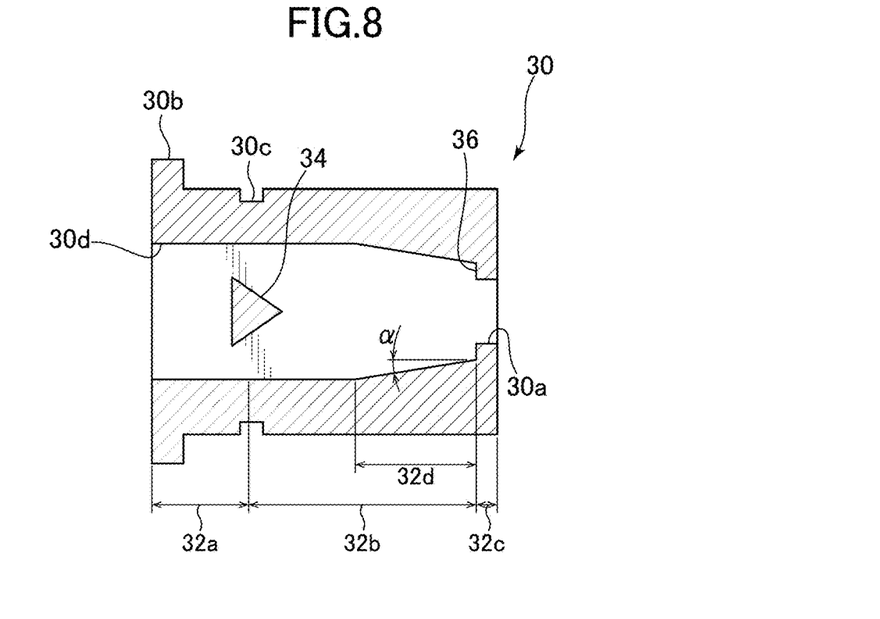
FIG. 8:
A plan view cross section of an oscillation inducing element in a second embodiment of the invention.

Next, referring to FIG. 8, we explain a shower head according to a second embodiment of the invention.

In the shower head of this embodiment, only the structure of the built-in oscillation inducing element passageway differs from the above-described first embodiment. Therefore here we explain only the points about the present embodiment which differ from the first embodiment, and omit an explanation of similar constitutions, operations, and effects.

FIG. 8 is a plan view cross section of an oscillation inducing element in a second embodiment of the invention.

As shown in FIG. 8, the oscillation inducing element 30 in the present embodiment differs from the first embodiment in the constitution of its vortex street passageway; the upstream side of the vortex street passageway is constituted as a fixed cross section passageway. A passageway with a rectangular cross section is formed on the inside of the oscillation inducing element 30 so as to penetrate in the longitudinal direction. This passageway is formed, in order starting from the upstream side, by a water supply passageway 32a, a vortex street passageway 32b, and a flow-aligning passageway 32c.

The water supply passageway 32a is a straight line passageway with an essentially constant rectangular cross section, extending from the inflow port 30d on the rear surface side of the oscillation inducing element 30.

The vortex street passageway 32b is a rectangular cross section passageway disposed to connect to the water supply passageway 32a on the downstream side of the water supply passageway 32a. I.e, the device end of the water supply passageway 32a and the upstream end of the vortex street passageway 32b have the same dimensions and shapes. The pair of opposing wall surfaces (both side surfaces) in the vortex street passageway 32b are formed to be parallel on the upstream side, while a tapered part 32d is disposed on the downstream side thereof, constituted to taper so that the flow path cross section narrows toward the downstream end. I.e., after extending with a fixed cross section from the upstream end, the vortex street passageway 32b is constituted to become gradually narrower in width toward the downstream side.

The flow-aligning passageway 32c is a rectangular cross section passageway disposed on the downstream side to communicate with the vortex street passageway 32b (tapered part 32d); it is formed in a straight line, with a fixed cross section. Hot or cold water including vortex streets guided by the vortex street passageway 32b is aligned by this flow-aligning passageway 32c and discharged from the spout water port 30a. The flow path cross section of this flow-aligning passageway 32c is constituted to be smaller than the flow path cross section of the downstream end portion of the vortex street passageway 32b (tapered part 32d), and a step portion 36, being a separating portion, is formed between the vortex street passageway 32b and the flow-aligning passageway 32c. The stepped portion wall surface, being the surface of this stepped portion 36, is oriented in a direction perpendicular to the center axis line of the vortex street passageway 32b. Hence the angle formed by the vortex street passageway 32b tapered wall surface is greater than 90° (90°+α°). Also, the length of the stepped portion wall surface is constituted to be shorter than the length of the tapered part wall surface.

On the other hand, as in the first embodiment, the wall surfaces (ceiling surface and floor surface) opposite the water supply passageway 32a, street passageway 32b, and flow-aligning passageway 32c in the height direction are all disposed in the same plane. I.e., the heights of the water supply passageway 32a, street passageway 32b, and flow-aligning passageway 32c are all the same, and are fixed.

Next, a water collision portion 34 is disposed on the downstream end portion of the water supply passageway 32a (close to the connecting portion between the water supply passageway 32a and the vortex street passageway 32b) so as to block a portion of the flow path cross section of the water supply passageway 32a. The constitution of this water collision portion 34 is the same as in the first embodiment, so an explanation thereof is here omitted.

It has been confirmed that by forming the length in the axial direction of the vortex street passageway 32b tapered part 32d to be longer than the length in the axial direction of the flow-aligning passageway 32c, changes in the discharge area caused by the flow volume of discharged hot or cold water can be sufficiently suppressed. The length in the axial direction of the tapered part 32d is preferably formed to be 4 or more times the length in the axial direction of the flow-aligning passageway 32c. Also, the angle formed between the vortex street passageway 32b side wall surface and the center axis line (angle α in FIG. 9) is approximately 7°. The angle formed by the side wall surface and the center axis line is preferably between approximately 3° and 25°. By setting the angle in this manner, Coanda effect occurrences can be suppressed, while changes in spout area associated with changes in discharge flow volume are also suppressed. In addition, the flow path cross section of the part at the downstream end of the water supply passageway 32a in which a portion is blocked by the water collision portion 34 (the surface area resulting from subtracting the water collision portion 34 from the flow path cross section of the water supply passageway 32a) is constituted to be larger than the flow path cross section of the flow-aligning passageway 32c.

Figure 9:
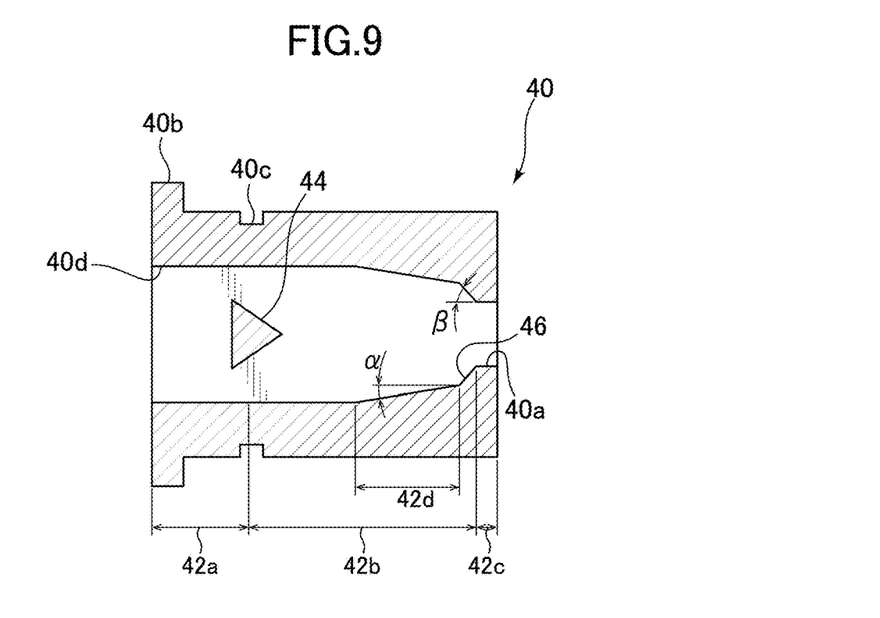
FIG. 9:
A plan view cross section of an oscillation inducing element in a third embodiment of the invention.

Next, referring to FIG. 9, we explain a showerhead according to a third embodiment of the invention.

In the showerhead of this embodiment, only the structure of the built-in oscillation inducing element passageway differs from the above-described first embodiment. Therefore here we explain only the points about the present embodiment which differ from the first embodiment, and omit an explanation of similar constitutions, operations, and effects.

FIG. 9 is a plan view cross section of an oscillation inducing element in a third embodiment of the invention.

As shown in FIG. 9, the oscillation inducing element 40 in the present embodiment differs from the first embodiment in the constitution of its vortex street passageway and in the constitution of its separating portion; the vortex street passageway upstream side is constituted as a passageway with a fixed cross section, and the angle of the stepped portion between the vortex street passageway and the flow-aligning passageway differs from the first embodiment. I.e., a passageway with a rectangular cross section is formed on the inside of the oscillation inducing element 40 so as to penetrate in the longitudinal direction. This passageway is formed, in order starting from the upstream side, by the inlet portion water supply passageway 42a, the vortex street passageway 42b, and the flow-aligning passageway 42c.

The water supply passageway 42a is a straight line passageway with an essentially constant rectangular cross section, extending from the inflow port 40d on the rear surface side of the oscillation inducing element 40.

The vortex street passageway 42b is a rectangular cross section passageway disposed to connect to the water supply passageway 42a on the downstream side of the water supply passageway 42a. I.e, the device end of the water supply passageway 42a and the upstream end of the street passageway 42b have the same dimensions and shapes. The pair of opposing wall surfaces (both side surfaces) in the vortex street passageway 42b are formed to be parallel on the upstream side, while on the downstream side a tapered part 42d is disposed, constituted to taper so that the flow path cross section narrows toward the downstream end. I.e., after extending with a fixed cross section from the upstream end, the vortex street passageway 42b is constituted to become gradually narrower in width toward the downstream side.

A flow-aligning passageway 42c is a rectangular cross section passageway disposed on the downstream side of the vortex street passageway 42b (tapered part 42d) and extending with a fixed cross section in a straight line up to the spouting port 40a. Furthermore, a stepped portion 46 is disposed between the vortex street passageway 42b (tapered part 42d) and the flow-aligning passageway 42c, and the stepped portion wall surface, being the surface of this stepped portion 46, consists of a tapered wall surface. The stepped portion wall surface is tapered such that its flow path cross section narrows toward the downstream side at an angle greater than the wall surface of the tapered part 42d (the tapered part wall surface). Therefore the downstream end of the vortex street passageway 42b (tapered part 42d) has the same dimensional shape as the upstream end of the stepped portion 46, and the upstream end of the flow-aligning passageway 42c has the same dimensions and shape as the downstream end of the stepped portion 46. Also, the length of the stepped portion wall surface is constituted to be shorter than the length of the tapered part wall surface.

On the other hand, as in the first embodiment, the wall surfaces (ceiling surface and floor surface) opposite the water supply passageway 42a, street passageway 42b, and flow-aligning passageway 42c in the height direction are all disposed in the same plane. I.e., the heights of the water supply passageway 42a, street passageway 42b, and flow-aligning passageway 42c are all the same, and are fixed.

Next, a water collision portion 44 is disposed on the downstream end portion of the water supply passageway 42a (close to the connecting portion between the water supply passageway 42a and the vortex street passageway 42b) so as to block a portion of the flow path cross section of the water supply passageway 42a. The constitution of this water collision portion 44 is the same as in the first embodiment, so an explanation thereof is here omitted.

As in the second embodiment, it has been confirmed that by forming the length in the axial direction of the vortex street passageway 42b tapered part 42d to be longer than the length in the axial direction of the flow-aligning passageway 42c, changes in the discharge area caused by the flow volume of discharged hot or cold water can be sufficiently suppressed. The length of the tapered part 42d is preferably formed to be 4 or more times the length of the flow-aligning passageway 42c. The angle formed by the vortex street passageway 42b side wall surface and the center axis line (angle α in FIG. 9) is approximately 7°, and the angle formed by the stepped portion 46 and the center axis line (angle β in FIG. 9) is approximately 45°. Preferably, the angle formed by the vortex street passageway 42b side wall surface and the center axis line is set to between approximately 3° and 25°, and the angle formed by the stepped portion 46 and the center axis line is set to between approximately 40° and 90°. By setting the angle in this manner, Coanda effect occurrences can be suppressed, while changes in spout area associated with changes in discharge flow volume are also suppressed. Furthermore, the flow path cross section of the part at the downstream end of the water supply passageway 42a in which a portion is blocked by the water collision portion 44 (the surface area resulting from subtracting the water collision portion 44 from the flow path cross section of the water supply passageway 42a) is constituted to be larger than the flow path cross section of the flow-aligning passageway 42c.

Using the showerhead (1) of the present embodiment of the invention, hot or cold water discharged from a showerhead can be made to oscillate back and forth by an oscillation inducing element (4, 30, 40), therefore hot or cold water can be discharged over a wide range from a single spouting port using a compact and simple structure. Also, the spout water direction can be changed without moving the discharging nozzle, thereby enabling a showerhead to be constituted at low cost and with high durability, without problems such as wear of the moving portions. A tapered part (10b, 32d, 42d), in which the flow path cross section narrows, is disposed in the vortex street passageway (10b, 32b, 42b) of the oscillation inducing element, so the spouting area does not change significantly depending on the flow volume of spouted hot or cold water, and a conveniently usable showerhead can be provided. Moreover, a stepped portion (12, 36, 46) for causing separation of the flow of hot or cold water along the vortex street passageway wall surface is placed at the downstream end of the vortex street passageway, therefore the Coanda effect can be suppressed when there is an outflow from the flow-aligning passageway, and droplets can be evenly distributed in the spouting area.

In the showerhead (1) of the present embodiment, the slope angle of the stepped portion (12, 36, 46) is formed to be greater than the slope angle of the tapered part wall surface (10b, 32d, 42d), therefore the flow inside the vortex street passageway (10b, 32b, 42b) along the tapered part wall surface can be effectively separated from the wall surface, and the Coanda effect can be reliably suppressed.

In addition, in the showerhead (1) of the present embodiment the length of the stepped portion (12, 36, 46) is constituted to be shorter than the length of the tapered part wall surface (10b, 32d, 42d), therefore occurrences of the Coanda effect caused by the flow of hot or cold water along the separating portion wall surface over long distances can be prevented.

We have described above a preferred embodiment of the present invention, but various changes may be applied to the above-described embodiments. In particular, in the above-described embodiment the invention was applied to a shower head, but the invention may also be applied to any desired spout apparatus, such as a faucet apparatus used in a kitchen sink or washbasin, or a warm water flush apparatus installed on a toilet seat, or the like. In the above-described present embodiment, multiple oscillation inducing elements were provided in a shower head, but any desired number of oscillation inducing elements may be provided in the spout apparatus according to application, and a spout apparatus comprising a single oscillation inducing element may also be constituted.

Note that in the above-described embodiment of the invention we explained the shape of the oscillation inducing element passageway using terms such as "width" and "height" for convenience, but these terms do not define the direction in which the oscillation inducing element is disposed; the oscillation inducing element may be oriented in any desired direction. For example, the oscillation inducing element may also be used by orienting the "height" in the above-described embodiment in the horizontal direction.

EXPLANATION OF REFERENCE NUMERALS

1: a shower head, being the spout apparatus of the first embodiment of the present invention
2: shower head main body (spout apparatus main body)
4: oscillation inducing element
4a: spout water port
4b: flange portion
4c: channel 4d: inflow port
6: water conduit-forming member
6a: shower hose connecting member
6b: packing
8: oscillation inducing element holding member
8a: element insertion holes
10a: water supply passageway
10b: vortex street passageway
10c: flow-aligning passageway
12; step portion (separation portion)
14: water collision portion
20: oscillation inducing element
20a: spouting port
20d: inflow port
22a: water supply passageway
22b: vortex street passageway
22c: flow-aligning passageway
24: water collision portion
30: oscillation inducing element
30a: spouting port
30d: inflow port
32a: water supply passageway
32b: vortex street passageway
32c: flow-aligning passageway
32d: tapered portion
34: water collision portion
36: step portion (separation portion)
40: oscillation inducing element
40a: spouting port
40d: inflow port
42a: water supply passageway
42b: vortex street passageway
42c: flow-aligning passageway
42d: tapered portion
44: water collision portion
46: stepped portion
102: spray nozzle
102a: spray port
104: feedback flow path
110: anterior chamber
110a: wall surface
110b: wall surface
112: outlet
114: intake port
116: obstacle

The invention claimed is:

1. A spout apparatus for discharging water with reciprocal motion from a spouting port, comprising:
a spout apparatus main body; and
an oscillation inducing element, which is disposed on the spout apparatus main body, the oscillation inducing element being configured to discharge supplied water with reciprocal motion, wherein the oscillation inducing element comprises:
a water supply passageway into which water supplied from the spout apparatus main body flows, the water supply passageway comprising a constant cross-section in a downstream end portion thereof;
a water collision portion, which is disposed at the downstream end portion of the water supply passageway and comprises an island shape at a center in a width direction of the water supply passageway, the water collision portion being configured to block a portion of the cross section of the water supply passageway, wherein the water collision portion alternately produces oppositely circulating vortexes on a downstream side of the water collision portion by colliding with water guided by the water supply passageway;
a vortex street passageway, comprising a tapered part, disposed downstream of the water supply passageway and connected to the downstream end portion of the water supply passageway so as to guide the vortex formed by the water collision portion while causing it to grow, and the tapered part being tapered so that a cross section of flow path narrows toward a downstream end of the vortex street passageway;
a separating portion, placed at the downstream end of the vortex street passageway, configured to suppress the Coanda effect acting on the flow of water along a wall surface of the vortex street passageway, wherein a cross-section of the separating portion is tapered toward downstream of the oscillation inducing element; and
a flow-aligning passageway, placed on a downstream side of the separating portion, configured to align the flow of water passing through the separating portion,
wherein opposite side walls of the tapered part of the vortex street passageway extend linearly and are angled relative to wall surfaces of the separating portion.

2. The spout apparatus of claim 1, wherein the separating portion is formed by a separating portion wall surface disposed to slope relative to a center axis line of the vortex street passageway, and a slope angle of the separating portion wall surface is formed to be greater than the slope angle of a tapered part wall surface forming the tapered part.

3. The spout apparatus of claim 2, wherein an angle formed by the tapered part wall surface and the separating portion wall surface is greater than 90°.

4. The spout apparatus of claim 2, wherein a length of the separating portion wall surface is shorter than a length of the tapered part wall surface.

5. The spout apparatus of claim 2, wherein the tapered part wall surface is sloped from 3° to 25° relative to the center axis line of the vortex street passageway.

6. The spout apparatus of claim 1, wherein the separating portion comprises a tapered part, which extends from the downstream end of the vortex street passageway.

7. The spout apparatus of claim 6, wherein opposite side walls of the downstream end portion of the water supply passageway extend parallel to a center axis line of the water supply passageway.

8. The spout apparatus of claim 1, wherein the downstream end portion of the water supply passageway comprises parallel opposite side walls, which are longer than the flow-aligning passageway and shorter than the vortex street passageway.

9. The spout apparatus of claim 8, wherein each of the parallel opposite side walls of the water supply passageway is longer than a length of the water collision portion in a longitudinal direction of the water supply passageway.

* * * * *